(12) United States Patent
Hou et al.

(10) Patent No.: US 12,382,502 B2
(45) Date of Patent: Aug. 5, 2025

(54) RANDOM ACCESS RESPONSE METHOD AND APPARATUS

(71) Applicant: Huawei Technologies Co., Ltd., Guangdong (CN)

(72) Inventors: Hailong Hou, Beijing (CN); Yongqiang Fei, Shenzhen (CN); Chaojun Li, Beijing (CN); Juan Zheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 17/896,848

(22) Filed: Aug. 26, 2022

(65) Prior Publication Data

US 2022/0418007 A1     Dec. 29, 2022

Related U.S. Application Data

(63) Continuation of application No. PCT/CN2021/077849, filed on Feb. 25, 2021.

(30) Foreign Application Priority Data

Feb. 28, 2020   (CN) .......................... 202010129471.8

(51) Int. Cl.
  *H04W 74/0833*     (2024.01)
(52) U.S. Cl.
  CPC .............................. *H04W 74/0833* (2013.01)
(58) Field of Classification Search
  None
  See application file for complete search history.

(56) References Cited

U.S. PATENT DOCUMENTS 12,160,894 B2 * 12/2024 Futaki ................... H04L 5/0092
2014/0016534 A1 * 1/2014 Kim ....................... H04L 5/0053
                                                                  370/312

(Continued)

FOREIGN PATENT DOCUMENTS

| CN | 110062461 A | 7/2019 |
|---|---|---|
| CN | 110351736 A | 10/2019 |

(Continued)

OTHER PUBLICATIONS

Qualcomm Incorporated: "msgB content in 2-step RACH", 3GPP Draft; R2-1907911,May 3, 2019, XP051712171, total 3 pages.

(Continued)

*Primary Examiner* — Hassan A Phillips
*Assistant Examiner* — Gautam Sharma
(74) *Attorney, Agent, or Firm* — WOMBLE BOND DICKINSON (US) LLP

(57) ABSTRACT

Embodiments of this application provide a random access response method and an apparatus. The method includes: RARs associated with one RO are transmitted based on groups, so that a transport block size of RAR data transmitted each time is reduced, and N bits in DCI format 1_0 of CRC are scrambled by using a RA-RNTI to indicate scheduling information of N RAR groups in a PDSCH. Alternatively, DCI format 1_0 of CRC is scrambled by using identifiers of RAR groups, to correspondingly schedule the RAR groups in the PDSCH. According to this application, a problem of a large transport block caused by a large quantity of RARs being transmitted in a PDSCH can be avoided, so that a modulation order or a bit rate is reduced, and demodulation performance of a terminal device is improved.

20 Claims, 6 Drawing Sheets

(56) References Cited

U.S. PATENT DOCUMENTS

| | | | | |
|---|---|---|---|---|
| 2018/0184461 A1* | 6/2018 | Zhang | ................. | H04W 72/044 |
| 2020/0059957 A1 | 2/2020 | Pan et al. | | |
| 2021/0105824 A1* | 4/2021 | Lei | ....................... | H04L 1/1854 |
| 2021/0136834 A1* | 5/2021 | Xu | .................... | H04W 74/0833 |
| 2023/0209604 A1* | 6/2023 | Lei | .................... | H04W 74/0833 |
| | | | | 370/329 |

FOREIGN PATENT DOCUMENTS

| | | |
|---|---|---|
| CN | 110771248 A | 2/2020 |
| EP | 3399817 A1 | 11/2018 |
| WO | 2014065593 A1 | 5/2014 |

OTHER PUBLICATIONS

Zte, Sanechips, On 2-Step RACH Procedures. 3GPP TSG RAN WG1 Meeting #96bis, Xi an, China Apr. 8-Apr. 12, 2019, R1-1903879, 10 pages.

3GPP TS 38.213 V16.0.0 (Dec. 2019), 3rd Generation Partnership Project; Technical Specification Group Radio Access Network; NR; Physical layer procedures for control(Release 16), 146 pages.

3GPP TS 38.321 V15.8.0 (Dec. 2019), 3rd Generation Partnership Project; Technical Specification Group Radio Access Network; NR; Medium Access Control (MAC) protocol specification(Release 15), 78 pages.

3GPP TS 38.214 V16.0.0 (Dec. 2019), 3rd Generation Partnership Project; Technical Specification Group Radio Access Network; NR; Physical layer procedures for data(Release 16), 147 pages.

* cited by examiner

| E | T | R | R | BI |
|---|---|---|---|---|
| E | T | | RAPID | |
| R | | Timing advance | | |
| | Timing advance | | Uplink | |
| Uplink grant | | | | |
| Uplink grant | | | | |
| Uplink grant | | | | |
| Temporary C-RNTI | | | | |
| Temporary C-RNTI | | | | |

FIG. 3

RANDOM ACCESS RESPONSE METHOD AND APPARATUS

CROSS-REFERENCE TO RELATED APPLICATIONS

This application is a continuation of International Application No. PCT/CN2021/077849, filed on Feb. 25, 2021, which claims priority to Chinese Patent Application No. 202010129471.8, filed on Feb. 28, 2020. The disclosures of the aforementioned applications are hereby incorporated by reference in their entireties.

TECHNICAL FIELD

This application relates to the field of wireless network technologies, and in particular, to a random access response method and an apparatus.

BACKGROUND

In long term evolution (LTE) and new radio (NR), a terminal device completes uplink time synchronization with a network device through a random access process. The network device detects, on a random access occasion (RO) resource, random access preambles sent by the terminal device. If obtaining the preambles through detection, the network device sends random access responses (RAR) to the terminal device. In this process, if a relatively large quantity of preambles are multiplexed on a same RO, a relatively large amount of RAR data is transmitted. As a result, a transport block size (TBS) of a physical downlink shared channel (PDSCH) carrying the RARs is relatively large. When transmission resources are limited, a modulation order or a bit rate is very high, and demodulation performance is poor.

SUMMARY

This application provides a random access response method and an apparatus, to reduce a modulation order or a bit rate, and improve demodulation performance of a terminal device.

According to a first aspect, an embodiment of this application provides a random access response method, including: A network device receives a first random access preamble from a first terminal device and a second preamble from a second terminal device; sends a first random access response RAR to the first terminal device based on the first preamble, where the first RAR belongs to a first RAR group, and the first RAR is carried on a first physical downlink shared channel PDSCH; and sends a second RAR to the second terminal device based on the second preamble, where the second RAR belongs to a second RAR group, and the second RAR is carried on a second PDSCH. The first preamble and the second preamble correspond to a same random access occasion. RARs associated with one RO are transmitted based on groups, so that a transport block size of RAR data transmitted each time is reduced. This reduces a modulation order or a bit rate, and improves demodulation performance of the terminal device.

In some embodiments, the network device sends first information to the first terminal device, where the first information indicates at least one RAR group carried on the first PDSCH, and the at least one RAR group includes the first RAR group. The first information is sent to the terminal device, to indicate the RAR groups carried on the PDSCH. This helps reduce Msg2 false alarms detected by UE and power consumption.

In some embodiments, the at least one RAR group further includes the second RAR group, and the first PDSCH and the second PDSCH are a same PDSCH. The RAR groups carried on the PDSCH may be dynamically configured by using downlink control information (DCI), so that the network device may flexibly configure, based on a channel resource status of a network, a manner of transmitting the RARs. This improves running efficiency of a communication system.

In some embodiments, the first information is indicated by an indication field in the DCI, or the first RAR group and the second RAR group are indicated by a scrambling parameter in the DCI. The RAR groups carried on the PDSCH are indicated by the indication field or the scrambling parameter in the DCI, so that RAR detection performance is improved, and power consumption of the terminal device is reduced.

In some embodiments, the indication field includes N bits, the N bits are in a one-to-one correspondence with N RAR groups, and N is a positive integer. The RAR groups carried on the PDSCH are indicated by the N-bit indication field in the DCI, so that RAR detection performance is improved, and power consumption of the terminal device is reduced.

In some embodiments, an $i^{th}$ bit in the N-bit indication field is used to indicate scheduling information of a random access response group corresponding to the $i^{th}$ bit carried on the PDSCH, where i is an integer greater than or equal to 1 and less than or equal to N.

In some embodiments, when the $i^{th}$ bit is 0, the PDSCH does not include the random access response group corresponding to the $i^{th}$ bit; or when the $i^{th}$ bit is 1, the PDSCH includes the random access response group corresponding to the $i^{th}$ bit.

In some embodiments, the RAR groups carried on the PDSCH are indicated by the indication field in the DCI, so that the RAR groups can be flexibly scheduled based on a network requirement. For example, when network load exceeds a preset threshold, a plurality of RAR groups may be carried on one PDSCH for transmission, so that the network load is reduced. When network load does not exceed a preset threshold, both Msg2 detection performance and power saving performance of the terminal device can be considered, and a plurality of RAR groups are carried on a plurality of PDSCHs for transmission. For another example, a RAR group corresponding to a common intelligent terminal and a RAR corresponding to a terminal that supports data transmission in an inactive state are carried on one PDSCH for transmission, or may be separately transmitted.

In some embodiments, when the first RAR group and the second RAR group are carried on a same PDSCH for transmission, the first PDSCH and the second PDSCH are a same PDSCH. When the first RAR group and the second RAR group are carried on different PDSCHs for transmission, the first PDSCH and the second PDSCH are different PDSCHs.

In some embodiments, the scrambling parameter is determined based on an identifier of a RAR group. The RAR groups carried on the PDSCH are indicated by the identifiers of the RAR groups, so that RAR detection performance is improved, and power consumption of the terminal device is reduced.

The RAR groups are indicated by the scrambling parameter in the DCI. The terminal device only needs to listen to DCI format 1_0 of CRC scrambled by using an identifier of a RAR group in which the terminal device is located and a RA-RNTI, and does not need to listen to and parse DCI indicating other RAR groups.

In some embodiments, the RAR group meets at least one of the following: the RAR group is an equal group; the RAR group is a random group; and the RAR group is classified based on a type of the terminal device.

In some embodiments, the network device sends second information to the first terminal device and the second terminal device, where the second information indicates a RAR group, so that the terminal device performs RAR detection based on the RAR group. This improves demodulation performance of the terminal device, and reduces power consumption of the terminal device.

In some embodiments, the second information further indicates to determine, based on RAR group information, a PDSCH corresponding to RARs, and indicates that a RAR group transmission function is enabled, so that the terminal device may receive the RARs in a RAR group transmission manner. This improves running efficiency of the terminal device.

In some embodiments, the network device sends third information to the first terminal device and the second terminal device, where the third information indicates a preamble group. The preamble group is sent to the terminal device, so that the terminal device may determine a RAR group based on the preamble group, and performs RAR detection based on the RAR group. This improves demodulation performance of the terminal device, and reduces power consumption of the terminal device.

According to a second aspect, an embodiment of this application provides a random access response method, including: A network device receives a random access preamble from a terminal device; sends first information to the terminal device, where the first information indicates at least one RAR group carried on a first PDSCH, and the at least one RAR group includes a first RAR group; and sends a random access response RAR to the first terminal device based on the first preamble, where the RAR belongs to the first RAR group, and the RAR is carried on a first PDSCH. RARs associated with one RO are transmitted based on groups, so that a transport block size of RAR data transmitted each time is reduced. This reduces a modulation order or a bit rate, and improves demodulation performance of the terminal device.

In some embodiments, the first information is indicated by an indication field in downlink control information DCI, or the first information is indicated by a scrambling parameter in DCI. The RAR groups carried on the PDSCH are indicated by the indication field or the scrambling parameter in the DCI, so that RAR detection performance is improved, and power consumption of the terminal device is reduced.

In some embodiments, the indication field includes N bits, the N bits are in a one-to-one correspondence with N RAR groups, and N is a positive integer. The RAR groups carried on the PDSCH are indicated by the N-bit indication field in the DCI, so that RAR detection performance is improved, and power consumption of the terminal device is reduced.

In some embodiments, the scrambling parameter is determined based on an identifier of a RAR group. The RAR groups carried on the PDSCH are indicated by the identifiers of the RAR groups, so that RAR detection performance is improved, and power consumption of the terminal device is reduced.

In some embodiments, the RAR group meets at least one of the following: the RAR group is an equal group; the RAR group is a random group; and the RAR group is classified based on a type of the terminal device.

In some embodiments, the network device sends second information to the terminal device, where the second information indicates a RAR group, so that the terminal device performs RAR detection based on the RAR group. This improves demodulation performance of the terminal device, and reduces power consumption of the terminal device.

In some embodiments, the second information further indicates to determine, based on RAR group information, a PDSCH corresponding to RARs, and indicates that a RAR group transmission function is enabled, so that the terminal device may receive the RARs in a RAR group transmission manner. This improves running efficiency of the terminal device.

In some embodiments, the network device sends third information to the terminal device, where the third information indicates a preamble group. The third information indicates the preamble group, so that the terminal device may determine a RAR group based on the preamble group, and performs RAR detection based on the RAR group. This improves demodulation performance of the terminal device, and reduces power consumption of the terminal device.

According to a third aspect, an embodiment of this application provides a random access response method, including: A terminal device sends a random access preamble to a network device; receives first information from the network device, where the first information indicates at least one RAR group carried on a first PDSCH, and the at least one RAR group includes a first RAR group; and receives a random access response RAR from the network device, where the RAR belongs to the first RAR group, and the RAR is carried on the first physical downlink shared channel PDSCH. RARs associated with one RO are transmitted based on groups, so that a transport block size of RAR data transmitted each time is reduced. This reduces a modulation order or a bit rate, and improves demodulation performance of the terminal device.

In some embodiments, the first information is indicated by an indication field in downlink control information DCI, or the first information is indicated by a scrambling parameter in DCI. The DCI is used to schedule a PDSCH. The RAR groups carried on the PDSCH are indicated by the indication field or the scrambling parameter in the DCI, so that RAR detection performance is improved, and power consumption of the terminal device is reduced.

In some embodiments, the indication field includes N bits, the N bits are in a one-to-one correspondence with N RAR groups, and N is a positive integer. The RAR groups carried on the PDSCH are indicated by the N-bit indication field in the DCI, so that RAR detection performance is improved, and power consumption of the terminal device is reduced.

In some embodiments, the scrambling parameter is determined based on an identifier of a RAR group. The RAR groups carried on the PDSCH are indicated by the identifiers of the RAR groups, so that RAR detection performance is improved, and power consumption of the terminal device is reduced.

In some embodiments, the RAR group meets at least one of the following: the RAR group is an equal group; the RAR group is a random group; and the RAR group is classified based on a type of the terminal device.

In some embodiments, the terminal device receives second information from the network device, where the second information indicates a RAR group, so that the terminal device performs RAR detection based on the RAR group. This improves demodulation performance of the terminal device, and reduces power consumption of the terminal device.

In some embodiments, the second information further indicates to determine, based on RAR group information, a PDSCH corresponding to RARs, and indicates that a RAR group transmission function is enabled, so that the terminal device may receive the RARs in a RAR group transmission manner. This improves running efficiency of the terminal device.

In some embodiments, the terminal device receives third information from the network device, where the third information indicates a preamble group, so that the terminal device may determine a RAR group based on the preamble group, and performs RAR detection based on the RAR group. This improves demodulation performance of the terminal device, and reduces power consumption of the terminal device.

According to a fourth aspect, an embodiment of this application provides a communication apparatus. The communication apparatus is, for example, a network device. The network device is configured to implement the method and the functions performed by the network device in any one of the first aspect or the possible implementations of the first aspect or any one of the second aspect or the possible implementations of the second aspect, and is implemented by hardware/software. The hardware/software includes units corresponding to the foregoing functions.

According to a fifth aspect, an embodiment of this application provides a communication apparatus. The communication apparatus is, for example, a terminal device. The terminal device is configured to implement the method and the functions performed by the terminal device in any one of the third aspect or the possible implementations of the third aspect, and is implemented by hardware/software. The hardware/software includes units corresponding to the foregoing functions.

According to a sixth aspect, an embodiment of this application provides another communication apparatus. The communication apparatus is, for example, a network device, including a processor and a communication interface. In an embodiment, the network device may further include a memory. The communication interface is configured to implement connection and communication between the processor and the memory, and the processor executes a program stored in the memory to implement steps in the random access response methods provided in the first aspect and the second aspect.

In some embodiments, the network device provided in this application may include corresponding units configured to perform behavior of the network device in the foregoing methods. The units may be software and/or hardware.

According to a seventh aspect, an embodiment of this application provides another communication apparatus. The communication apparatus is, for example, a terminal device, including a processor and a communication interface. In an embodiment, the terminal device may further include a memory. The communication interface is configured to implement connection and communication between the processor and the memory, and the processor executes a program stored in the memory to implement steps in the random access response method provided in the third aspect.

In some embodiments, the terminal device provided in this application may include corresponding units configured to perform behavior of the terminal device in the foregoing methods. The units may be software and/or hardware.

According to an eighth aspect, this application provides a computer-readable storage medium. The computer-readable storage medium stores instructions. When the instructions are run on a computer, the computer is enabled to perform the method according to the first aspect, the second aspect, or the third aspect.

According to a ninth aspect, this application provides a computer program product including instructions. When the instructions are run on a computer, the computer is enabled to perform the method according to the first aspect, the second aspect, or the third aspect.

According to a tenth aspect, an embodiment of this application provides a communication system. The communication system includes the network device according to the fourth aspect and the terminal device according to the fifth aspect.

According to an eleventh aspect, an embodiment of this application provides a chip. The chip includes a processor and a communication interface, and the processor is coupled to the communication interface, to implement the method provided in the first aspect, the second aspect, or the third aspect.

In an embodiment, the chip may further include a memory. For example, the processor may read and execute a software program stored in the memory, to implement the method provided in the first aspect, the second aspect, or the third aspect. Alternatively, a memory may not be included in the chip, but is located outside the chip. This is equivalent to that the processor may read and execute a software program stored in the external memory, to implement the method provided in the first aspect, the second aspect, or the third aspect.

BRIEF DESCRIPTION OF DRAWINGS

To describe the technical solutions in embodiments of this application or in the background more clearly, the following describes the accompanying drawings for describing embodiments of this application or the background.

FIG. 3 is a schematic diagram of a MAC subPDU in a RAR according to an embodiment of this application;

DESCRIPTION OF EMBODIMENTS

The following describes embodiments of this application with reference to the accompanying drawings in embodiments of this application.

Figure 1:
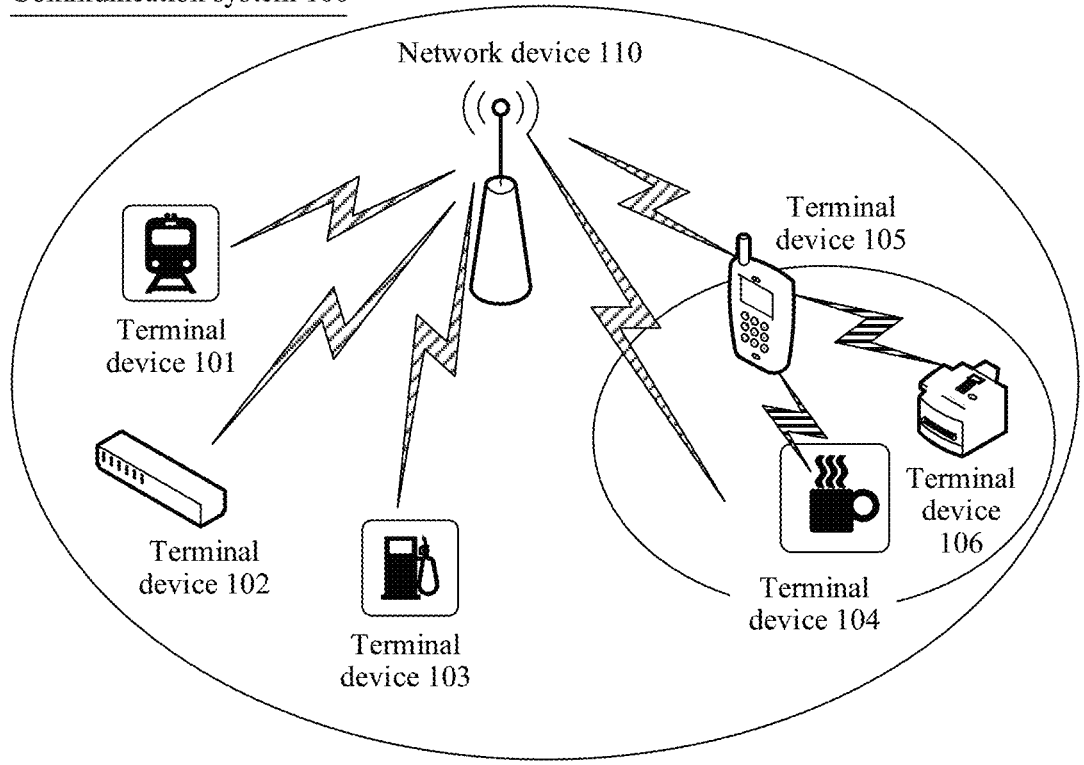
FIG. 1 is a schematic diagram of an architecture of a communication system according to an embodiment of this application.

FIG. 1 is a schematic diagram of an architecture of a communication system according to an embodiment of this application. The communication system 100 may include a network device 110 and a terminal device 101 to a terminal device 106. It should be understood that the communication system 100 may include more or fewer network devices or terminal devices. The network device or the terminal device may be hardware, may be software obtained through functional division, or may be a combination thereof. In addition, the terminal device 104 to the terminal device 106 may also form a communication system. For example, the terminal device 105 may send downlink data to the terminal device 104 or the terminal device 106. The network device and the terminal device may communicate with each other through another device or network element. The network device 110 may send downlink data to the terminal device 101 to the terminal device 106, or may receive uplink data sent by the terminal device 101 to the terminal device 106. Certainly, the terminal device 101 to the terminal device 106 may alternatively send uplink data to the network device 110, or may receive downlink data sent by the network device 110.

The terminal device in this embodiment of this application may be a device having a wireless transceiver function, and may be deployed on the land, including an indoor device, an outdoor device, a handheld device, or a vehicle-mounted device; or may be deployed on a water surface (for example, on a ship); or may be deployed in the air (for example, on a plane, a balloon, or a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In this embodiment of this application, an apparatus configured to implement a function of the terminal may be a terminal, or may be an apparatus, for example, a chip system, that can support the terminal in implementing this function. The apparatus may be installed in the terminal.

The network device 110 may be a base station (BS), or may be a device that is deployed in a radio access network and that may perform wireless communication with the terminal. The base station may be in a plurality of forms, such as a macro base station, a micro base station, a relay station, and an access point. For example, the base station in this embodiment of this application may be a base station in 5G or a base station in LTE. The base station in 5G may also be referred to as a transmission reception point (TRP) or a gNB. In this embodiment of this application, an apparatus configured to implement a function of the network device may be a network device, or may be an apparatus, for example, a chip system, that can support the network device in implementing this function. The apparatus may be installed in the network device.

The communication system 100 may use a public land mobile network (public land mobile network, PLMN), a device-to-device (D2D) network, a machine-to-machine (M2M) network, an internet of things (IoT), or another network. The communication system 100 may be applied to a 5th generation (5G) new radio (NR) system, or may be applied to a non-terrestrial communication network, for example, a communication network in which a base station is located on a satellite or another flight device, or a communication network in which a satellite, a flight device, or the like is used as a relay for forwarding. The communication system may alternatively be applied to a scenario that is based on a 5G architecture and in which communication is performed by using an unlicensed spectrum.

The technical solutions provided in embodiments of this application may be applied to wireless communication between communication devices. The wireless communication between the communication devices may include wireless communication between a network device and a terminal device, wireless communication between network devices, and wireless communication between terminal devices. In this embodiment of this application, the term "wireless communication" may be referred to as "communication" for short, and the term "communication" may also be described as "data transmission", "information transmission", or "transmission". The technical solutions may be used to perform wireless communication between a scheduling entity and a subordinate entity. A person skilled in the art may use the technical solutions provided in embodiments of this application to perform wireless communication between another scheduling entity and the subordinate entity, for example, wireless communication between a macro base station and a micro base station, for example, wireless communication between a first terminal device and a second terminal device.

In LTE and NR, the terminal device completes uplink time synchronization with the network device through a random access process. Before this, the terminal device receives a downlink synchronization signal sent by the network device, to complete downlink time synchronization and frequency synchronization. The downlink synchronization signal includes a primary synchronization signal (PSS) and a secondary synchronization signal (SSS).

A physical downlink shared channel (PDSCH) is used to carry downlink data. The network device may send the downlink data to the terminal device through the PDSCH. A PDSCH processing process usually includes performing processing such as performing channel coding and cyclic redundancy check (CRC) adding on a transport data block to obtain an encoded codeword, and then performing processing such as scrambling, modulation, precoding, and resource mapping on the encoded codeword.

Figure 2:
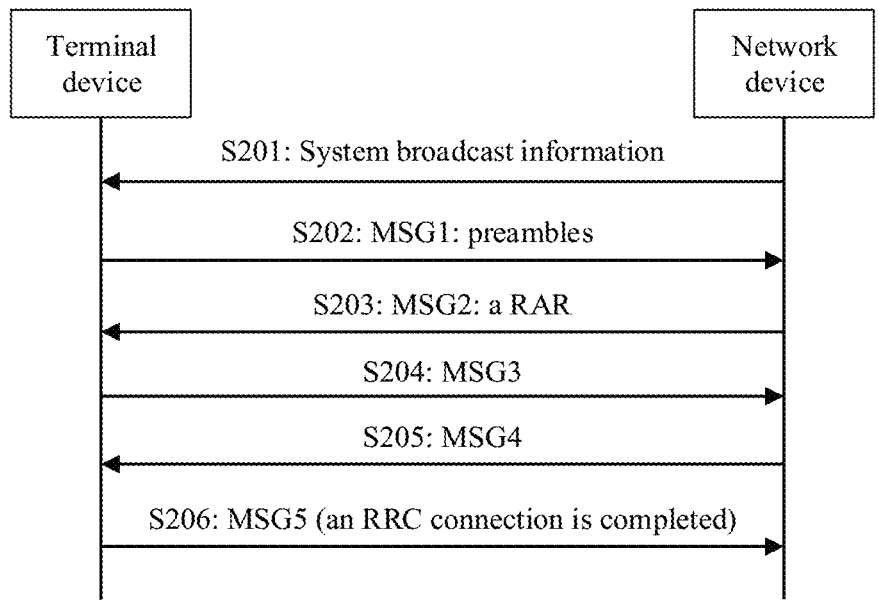
FIG. 2 is a schematic diagram of a random access process according to an embodiment of this application.

FIG. 2 is a schematic diagram of a random access process according to an embodiment of this application. The random access process is as follows:

S201: A terminal device receives a physical random access channel (PRACH) resource configuration by reading system broadcast information. The resource configuration may include time, a frequency, a preamble sequence, a subcarrier spacing, and the like.

S202: The terminal device sends preambles, namely, a Msg1, through a PRACH.

S203: After sending the Msg1, the terminal device starts a random access response window, and listens to, in the random access response window, a random access response RAR, namely, a Msg2, sent by a network device. If the terminal device successfully detects the RAR of the terminal device, random access succeeds, and the terminal device performs S204. If the terminal device does not receive the RAR of the terminal device, random access fails, and the terminal device re-initiates, based on a backoff parameter indicated by the network device, a random access process until a maximum quantity of times of random access is reached.

S204: The terminal device sends a Msg3 based on an indication of the RAR, where the Msg3 is used to request to establish a radio resource control (RRC) connection.

S205: After sending the Msg3, the terminal device listens to and receives a Msg4 delivered by the network device, where the Msg4 includes a contention resolution identifier and an air interface parameter configuration of the terminal device. If the terminal device successfully receives the Msg4, the random access succeeds, and the terminal device performs S206. Otherwise, the random access fails, and the terminal device re-initiates, based on the backoff parameter indicated by the network device, the random access process until the maximum quantity of times of random access is reached.

S206: The terminal device sends a Msg5 to the network device, where the Msg5 is used to indicate that the RRC connection is completed.

In addition, currently, in LTE and NR, the random access includes contention-based random access and non-contention-based random access. The contention-based random access and the non-contention-based random access refer to whether different terminal devices perform random access by using a same preamble. In the contention-based random access, the network device configures a preamble resource pool, and the terminal device randomly selects a preamble to perform random access. If the different terminal devices select the same preamble to perform random access, a contention conflict occurs, and the conflict is resolved in the Msg4. In the non-contention-based random access, the network device notifies or configures the terminal device to perform random access by using a specified preamble. The preamble is uniquely allocated to the UE for use, and therefore the UE does not conflict with another UE.

It should be understood that an RO refers to a time-frequency resource for sending and receiving RACH preambles. The network device may configure a plurality of mutually orthogonal preambles on a same RO, and a plurality of terminal devices may perform random access on a same RO by using a same preamble or different preambles. If obtaining, through detection on a RO resource, the preambles sent by the terminal device, the network device sends the RAR, namely, the Msg2, to the terminal device.

For RARs on the same RO, the network device may schedule a PDSCH by scrambling downlink control information (DCI) format 0_1 of cyclic redundancy check (CRC) by using a random access radio network temporary identifier (RA-RNTI). The PDSCH carries RARs to all or some of random access requests on the RO. One RO is associated with only one RA-RNTI. The network device and the terminal device may calculate the RA-RNTI based on time, a frequency, and a carrier of the RO by using the following calculation method:

RA-RNTI=1+s_id+14×t_id+14×80×f_id+14×80×8× ul_carrier_id, where s_id is the first orthogonal frequency division multiplexing (OFDM) symbol index of the RO, t_id is an index of the first slot of the RO in a radio frame, f_id is an index of the RO in frequency domain, and ul_carrier_id is an index of an uplink carrier on which the preambles are sent.

After sending the preambles, the terminal device starts a random access response time window (ra-response window), and listens to, in the ra-response window, DCI of CRC scrambled by using the RA-RNTI, where the DCI is delivered by the network device. If the terminal device receives the DCI scrambled by using the RA-RNTI, and RARs carried on a PDSCH scheduled by using the DCI include a media access control layer (MAC) sub protocol data unit (subPDU) identified by using a random access preamble identifier (RAPID) that is the same as a sent preamble index, the random access succeeds. Otherwise, it is considered that the random access fails.

FIG. 3 is a schematic diagram of a MAC subPDU in a RAR according to an embodiment of this application. The MAC subPDU may include a backoff indicator (BI), a RAPID, a timing advance, an uplink grant (UL grant), a temporary cell radio network temporary identifier (RA-RNTI), and the like.

In the foregoing random access process, the random access responses to all or some of the preambles on the same RO are carried on the same PDSCH for sending. If a large quantity of preambles are multiplexed on the same RO, a large amount of RAR data is transmitted, resulting in a large transport block size (TBS) of a PDSCH carrying the RARs. When transmission resources are limited, a modulation order or a bit rate is very high, resulting in poor demodulation performance. To resolve the foregoing technical problems, embodiments of this application provide the following solutions.

Figure 4:
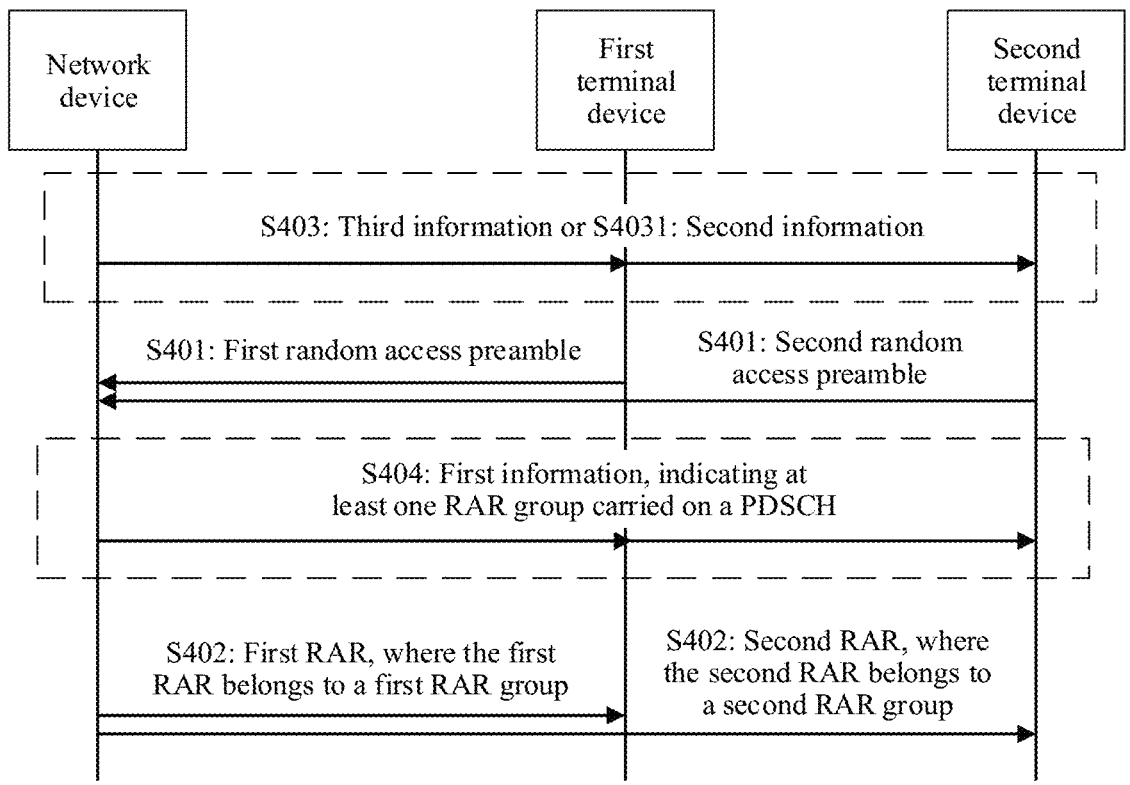
FIG. 4 is a schematic flowchart of a random access response method according to an embodiment of this application.

FIG. 4 is a schematic flowchart of a random access response method according to an embodiment of this application. This embodiment of this application includes at least the following operations.

S401: A network device receives a first random access preamble from a first terminal device and a second preamble from a second terminal device. The first preamble and the second preamble correspond to a same random access occasion.

It should be noted that the network device may receive random access preambles preamble from a plurality of different terminal devices. The plurality of different terminal devices include but are not limited to the first terminal device and the second terminal device. The different terminal devices may select, from a preamble resource pool configured by the network device, a same preamble to perform random access, or may select different preambles to perform random access. Alternatively, the terminal devices may use a preamble uniquely specified by the network device, to perform random access.

In an embodiment, before that a network device receives a first random access preamble from a first terminal device and a second preamble from a second terminal device, this embodiment of this application may further include the following operations.

S403: The network device sends third information to the first terminal device and the second terminal device, where the third information indicates a preamble group.

The third information is carried in an independent message, or the third information is carried in a PRACH resource configuration message. A form of sending the PRACH resource configuration message is not limited in this embodiment of this application.

In an implementation, the network device may send a PRACH resource configuration to the first terminal device and the second terminal device by using system broadcast information, for example, perform broadcasting by using a system information block 1 (SIB1). The PRACH resource configuration may further include a resource configuration such as time, a frequency, and a preamble sequence of a PRACH. During initial access, the terminal device may obtain the PRACH resource configuration by reading the SIB1. A random access preamble configured by using the SIB1 is applicable to a contention-based random access scenario.

In another implementation, the network device may send the PRACH resource configuration to the first terminal device and the second terminal device by using signaling such as RRC, a media access control (MAC) control element (CE), or DCI, to configure a dedicated preamble resource for each terminal device. This configuration manner is applicable to a non-contention-based random access scenario, for example, cell handover, or some data transmission based on a network configuration type in an RRC active (RRC inactive) state, and may be implemented in a user-level configuration in an RRC connected state or an RRC release (RRC release) state.

In an embodiment, the third information may be included in the PRACH resource configuration, or may not be included in the PRACH resource configuration. The third information may be carried in signaling or a signaling unit independent of the PRACH resource configuration. The network device may send the third information to the first terminal device and the second terminal device by using signaling such as an SIB1, RRC signaling, a MAC CE, or DCI. The third information indicates the preamble group.

In NR R17, a low-complexity terminal device, also referred to as a reduced capability terminal device, is introduced. Main application scenarios include an industrial wireless transmission network, video surveillance, an intelligent wearable device, and the like. There is another terminal device that supports uplink and downlink data transmission in the RRC inactive state. The terminal devices of the new types or in the new scenarios and a common terminal device may use a same preamble resource, or may use a dedicated preamble resource. If the terminal devices use the dedicated preamble resource, the network device may identify different types of terminal devices through a random access process, to enhance and optimize subsequent processes such as random access and service data transmission.

In an embodiment, this embodiment of this application further includes operation S4031: The network device sends second information to the first terminal device and the second terminal device, where the second information indicates a RAR group. In a possible implementation, the second information further indicates to determine, based on the RAR group information, a PDSCH corresponding to RARs, and the second information may include a RAR group transmission function enabled by the network device and configuration information indicating an RAR group. In other words, the second information may indicate that the RAR group transmission function is enabled. The network device sends the second information to the first terminal device and the second terminal device. After receiving the second information, the terminal device may receive the RARs on the corresponding PDSCH based on the RAR group information indicated in the second information.

In an embodiment, the network device may alternatively send fourth information to the first terminal device and the second terminal device, where the fourth information indicates that the RAR group transmission function is enabled. The fourth information and the second information are independent of each other.

Further, when the network device does not send the second information to the first terminal device or the second terminal device, the network device may implicitly indicate that the RAR group transmission function is disabled. Alternatively, the network device may send fifth information to the first terminal device and the second terminal device, where the fifth information indicates that the RAR group function is disabled. That the RAR group function is disabled may be understood as that RARs corresponding to a same PO are all carried on a same PDSCH. For example, both a first RAR and a second RAR are carried on one PDSCH.

In an embodiment, the second information may be included in the PRACH resource configuration, or may not be included in the PRACH resource configuration. The second information may be carried in signaling or a signaling unit independent of the PRACH resource configuration. The network device may send the second information to the first terminal device and the second terminal device by using signaling such as an SIB1, RRC signaling, a MAC CE, or DCI. The second information indicates the RAR group.

In an embodiment, the first terminal device and the second terminal device may determine the RAR group based on the preamble group. For a plurality of random access preambles on a same RO, a RAR is identified by using a random access preamble identifier (random access preamble index, RAPID). For example, one preamble may correspond to one RAR. Therefore, the RAR(s) may be grouped based on the preamble group (namely, RAPIDs) indicated by the third information. The RAR group may be the same as the preamble group. A preamble group manner may include but is not limited to the following manners.

First group manner: M configured or candidate preambles are all equally grouped into N groups. M is an integer greater than or equal to 1, and N is an integer greater than or equal to 1 and less than or equal to M.

Identifiers ID of the M preambles are respectively 1, 2, . . . , and M. RARs for which ID mod N=X may be grouped into one group. For example, M=9, and N=3. When X=1, that is, ID mod 3=1, a first preamble group is (1, 4, 7). When X=2, that is, ID mod 3=2, a second preamble group is (2, 5, 8). When X=0, that is, ID mod 3=0, a third preamble group is (3, 6, 9). Alternatively, N continuous RARs may be grouped into one group. For example, when M=9, and N=3, a first preamble group is (1, 2, 3), a second preamble group is (4, 5, 6), and a third preamble group is (7, 8, 9).

Second group manner: M configured or candidate preambles are all randomly grouped, that is, grouped in an uneven group manner. For example, identifiers ID of the M preambles are respectively 1, 2, . . . , and M. When M=9, and N=3, a first preamble group is (1, 2), a second preamble group is (4, 5, 6, 7, 9), and a third preamble group is (9).

Third group manner: Preambles may be grouped based on a type of the terminal device. For example, a common intelligent terminal may be grouped into one preamble group, and a terminal that supports data transmission in an inactive state may be grouped into another preamble group.

In an embodiment, after that a network device receives a first random access preamble from a first terminal device and a second preamble from a second terminal device, this embodiment of this application may further include the following operations.

S404: The network device sends first information to the first terminal device, where the first information indicates at least one RAR group carried on the first PDSCH, and the at least one RAR group includes the first RAR group. The first information is included in first DCI, and the first DCI is used to schedule the first PDSCH.

The first RAR group and the second RAR group may be carried on different PDSCHs, or the first RAR group and the second RAR group may be carried on a same PDSCH, namely, a shared PDSCH. If the first RAR group and the second RAR group are carried on the same PDSCH, the network device sends the first DCI to the first terminal device and the second terminal device. The first DCI is used to schedule the first PDSCH and a second PDSCH, the first PDSCH and the second PDSCH are a same PDSCH, and the at least one RAR group carried on the PDSCH includes the first RAR group and the second RAR group. If the first RAR group and the second RAR group are carried on the different PDSCHs, the network device sends the first DCI to the first terminal device, and sends second DCI to the second terminal device. The first DCI is used to schedule the first PDSCH, and the first PDSCH is used to carry the first RAR group. The second DCI is used to schedule the second PDSCH, and the second PDSCH is used to carry the second RAR group. The first PDSCH and the second PDSCH are different PDSCHs.

In other words, after receiving the first information, the terminal device may determine whether the PDSCH scheduled by using the DCI carries expected an RAR. The RAR groups carried on each PDSCH are dynamically configured by using DCI, so that the network device may flexibly configure, based on a channel resource status of a network, a manner of transmitting the RARs. This improves running efficiency of a communication system.

In an optional manner, the first information is indicated by an indication field in downlink control information DCI. The DCI includes an N-bit indication field, and N bits are, for example, N bits in reserved bits in DCI format 1_0. Each of the N bits corresponds to one random access response group, and the N-bit indication field is used to indicate scheduling information of the N random access response groups carried on the physical downlink shared channel PDSCH scheduled by using the DCI.

Further, an $i^{th}$ bit in the N-bit indication field is used to indicate scheduling information of a random access response group corresponding to the $i^{th}$ bit carried on the PDSCH, where i is an integer greater than or equal to 1 and less than or equal to N. When the $i^{th}$ bit is 0, the PDSCH does not include the random access response group corresponding to the $i^{th}$ bit; or when the $i^{th}$ bit is 1, the PDSCH includes the random access response group corresponding to the $i^{th}$ bit. 0 and 1 may alternatively be indicated in a reverse manner. Details are not described herein again.

Figure 5:
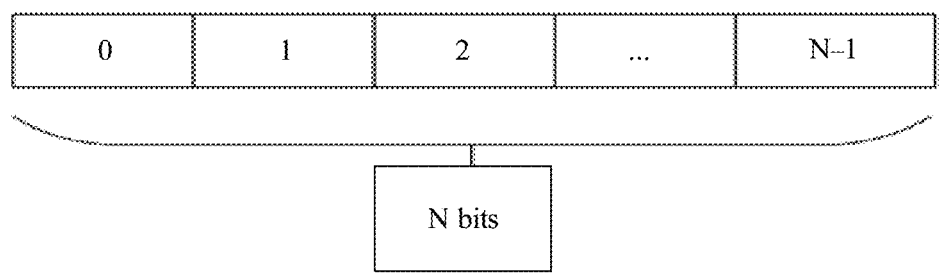
FIG. 5 is a schematic diagram of an indication field according to an embodiment of this application.

For example, the network device configures the M preambles, and the M preambles are grouped into a total of N groups. The plurality of different terminal devices send the preambles on a same RO based on the PRACH resource configuration, start a random access response window ra-response window, and listen to a physical downlink control channel (physical downlink control channel, PDCCH) in the random access response window. The network device detects the preambles on the RO. If obtaining one or more preambles through detection, the network device sends, to the terminal device, DCI format 1_0 of CRC scrambled by using a RA-RNTI, to schedule RARs. The DCI is carried on the PDCCH. FIG. 5 is a schematic diagram of an indication field according to an embodiment of this application. The DCI includes the N-bit indication field, used to indicate the scheduling information of the N random access response groups carried on the PDSCH scheduled by using the DCI. The N bits may be reserved bits in the DCI, or may be in an existing indication field. The N bits are in a one-to-one correspondence with the N RAR groups. The indication field may be referred to as a RAR scheduling indication field, or may be referred to as another name.

For example, if M=64, and N=4, the network device configures a total of 64 preambles, and all the preambles are grouped into a total of four groups. Correspondingly, all the RARs are also grouped into four groups, the indication field in DCI format 1_0 of the CRC scrambled by using the RA-RNTI includes four bits, and each bit corresponds to one RAR group.

In a case, one PDSCH carries two random access response groups. An indication field in first DCI may be 1100, indicating that a PDSCH scheduled by using the first DCI carries a first RAR group and a second RAR group. An indication field in second DCI may be 0011, indicating that a PDSCH scheduled by using the second DCI carries a third RAR group and a fourth RAR group. In an embodiment, an indication field in first DCI may be 1110, indicating that a PDSCH scheduled by using the first DCI carries a first RAR group, a second RAR group, and a third RAR group. An indication field in second DCI may be 0001, indicating that a PDSCH scheduled by using the second DCI carries a fourth RAR group. Other cases are similar. Details are not described herein again.

Figure 6:
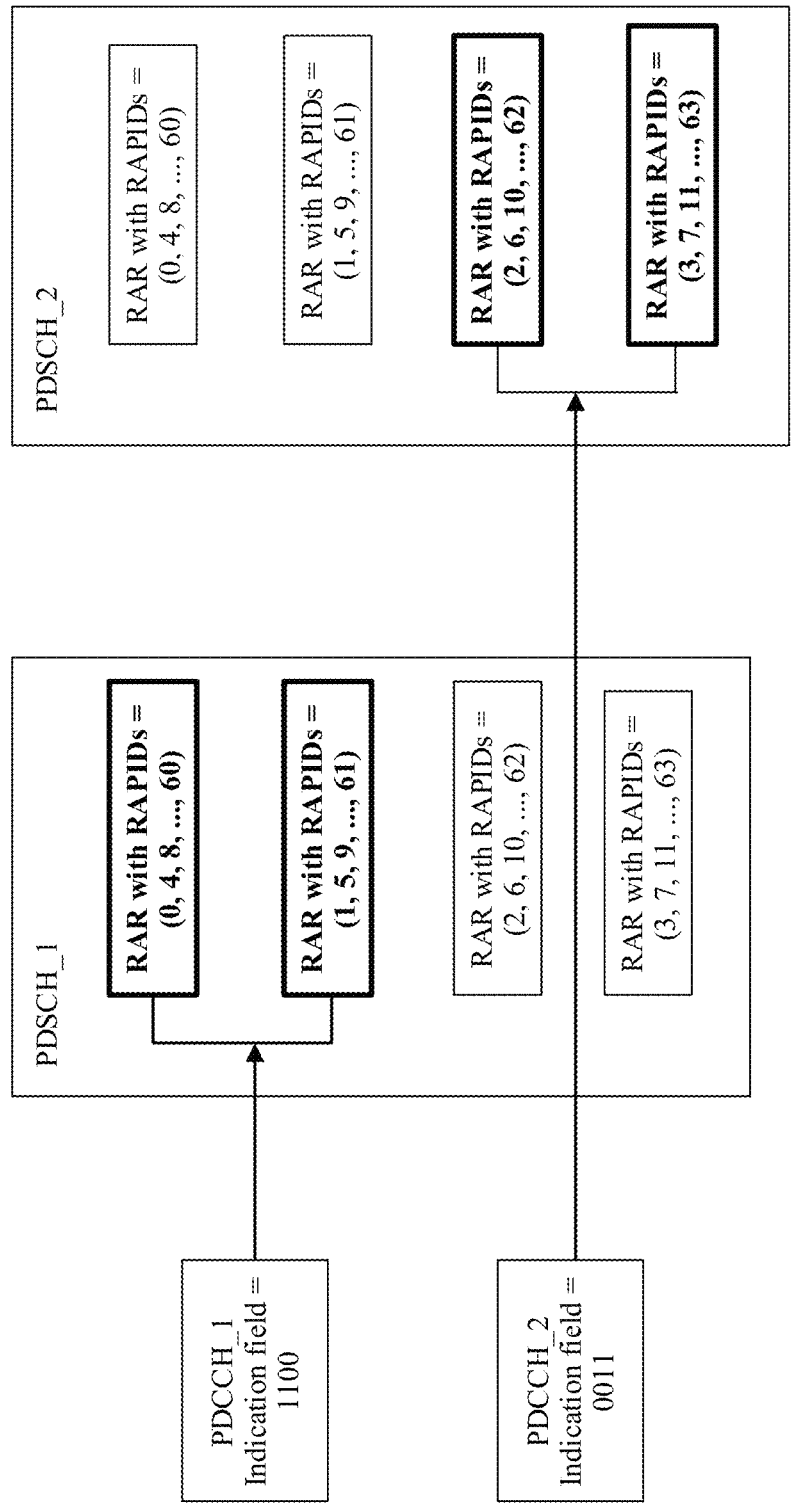
FIG. 6 is a schematic diagram of scheduling RAR groups according to an embodiment of this application.

FIG. 6 is a schematic diagram of scheduling RAR groups according to an embodiment of this application. 64 RARs are grouped into four RAR groups, including RAPIDs=(0, 4, 8, . . . , 60) of a first RAR group, RAPIDs=(1, 5, 9, . . . , 61) of a second RAR group, RAPIDs=(2, 6, 10, . . . , 62) of a third RAR group, and RAPIDs=(3, 7, 11, . . . , 63) of a fourth RAR group. The four RAR groups are sent by using two PDCCH+PDSCH combinations. An indication field of a PDCCH_1 is 1100, and DCI carried on the PDCCH_1 is used to schedule a PDSCH_1. Therefore, the PDSCH_1 carries the first RAR group and the second RAR group, including RARs with RAPIDs=(0, 4, 8, . . . , 60) and RARs with RAPIDs=(1, 5, 9, . . . , 61). An indication field of a PDCCH_2 is 0011, and DCI carried on the PDCCH_1 is used to schedule a PDSCH_2. Therefore, the PDSCH_2 carries the third RAR group and the fourth RAR group, including RARs with RAPIDs=(2, 6, 10, . . . , 62) and RARs with RAPIDs=(3, 7, 11, . . . , 63).

In another case, one PDSCH carries one random access response group. An indication field in first DCI may be 1000, indicating that a PDSCH scheduled by using the first DCI carries a first RAR group. An indication field in second DCI may be 0100, indicating that a PDSCH scheduled by using the second DCI carries a second RAR group. An indication field in third DCI may be 0010, indicating that a PDSCH scheduled by using the third DCI carries a third RAR group. An indication field in fourth DCI may be 0001, indicating that a PDSCH scheduled by using the fourth DCI carries a fourth RAR group. Other cases are not described again.

It should be understood that the RAR groups carried on the PDSCH are indicated by the indication field in the DCI, and the RAR groups may be flexibly scheduled based on a network requirement. Different RAR groups may be carried on a same PDSCH for transmission, or may be carried on different PDSCHs for transmission. For example, when network load exceeds a preset threshold, a plurality of RAR groups may be carried on one PDSCH for transmission, so that the network load is reduced. When network load does not exceed a preset threshold, both Msg2 detection performance and power saving performance of the terminal device can be considered, and a plurality of RAR groups are carried on a plurality of PDSCHs for transmission. For another example, a RAR group corresponding to a common intelligent terminal and a RAR corresponding to a terminal that supports data transmission in an inactive state are carried on one PDSCH for transmission, or may be separately transmitted.

In another optional manner, the first information may be indicated by a scrambling parameter in the DCI. The scrambling parameter is determined based on an identifier of a RAR group.

In an embodiment, the network device may first allocate an identifier to each RAR group. The foregoing preamble group information may include a correspondence between a preamble group and an identifier. Correspondingly, one RAR group corresponds to one identifier. Then, CRC of DCI format 1_0 is scrambled by using the identifier of the RAR group and a RA-RNTI.

Further, the network device may recalculate a new RA-RNTI based on the identifier of the RAR group, that is, calculate a new RA-RNTI based on all of time, a frequency, and a carrier of a RO and the identifier of the RAR group, and then scramble the CRC of the DCI format 1_0 by using the new RA-RNTI. A length of the new RANTI may remain 16 bits unchanged, or may be greater than 16 bits. Alternatively, when the RA-RNTI remains unchanged, the CRC of the DCI format 1_0 may be scrambled by using both the identifier of the RAR group and the RA-RNTI. In addition, the PDSCH scheduled by using the DCI carries only the RAR group corresponding to the identifier ID. After sending the preambles, the terminal device starts a random access response window (ra-response window), and only needs to listen to, in the random access response window, the DCI format 1_0 of the CRC scrambled by using (identifier ID+RA-RNTI).

Figure 7:
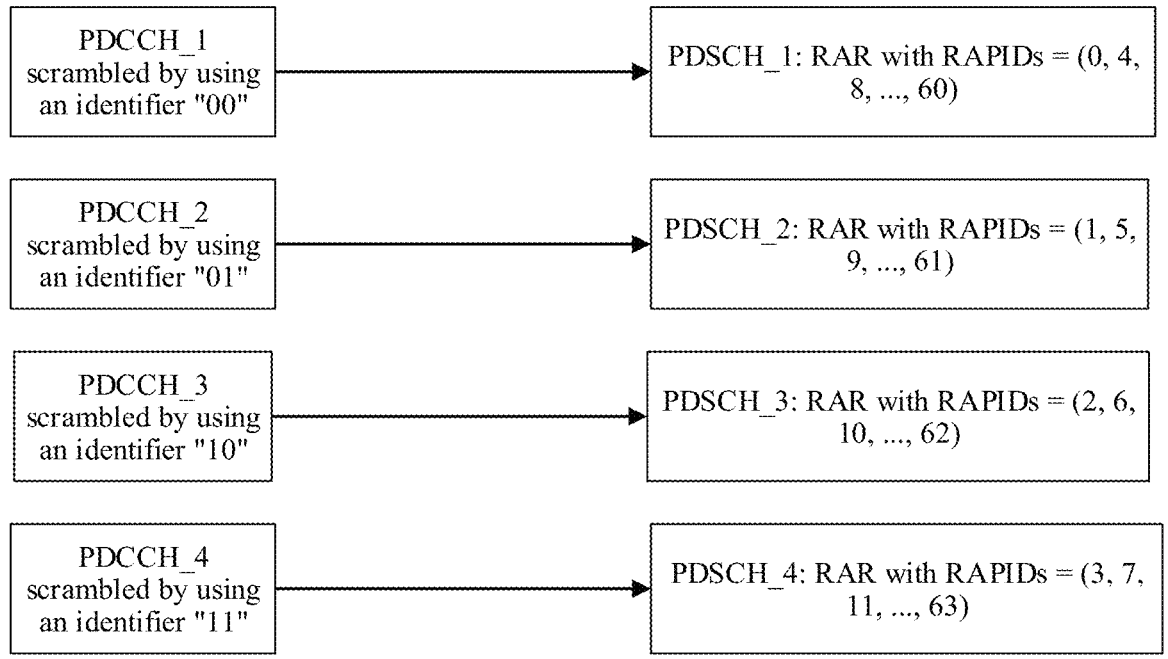
FIG. 7 is another schematic diagram of scheduling RAR groups according to an embodiment of this application.

For example, FIG. 7 is another schematic diagram of scheduling RAR groups according to an embodiment of this application. 64 RARs are grouped into four RAR groups, including RAPIDs=(0, 4, 8, . . . , 60), of a first RAR group, corresponding to an identifier 00; RAPIDs=(1, 5, 9, . . . , 61), of a second RAR group, corresponding to an identifier 01; RAPIDs=(2, 6, 10, . . . , 62), of a third RAR group, corresponding to an identifier 10; and RAPIDs=(3, 7, 11, . . . , 63), of a fourth RAR group, corresponding to an identifier 11. The four RAR groups are sent by using four PDCCH+PDSCH combinations. The PDCCH is used to carry DCI, and the RAR groups may be scheduled in the following manners.

First combination: DCI format 1_0 for scheduling a PDSCH_1 is scrambled by using (group identifier ID "00"+RA-RNTI), and the PDSCH_1 carries the first RAR group, including RARs with RAPIDs=(0, 4, 8, . . . , 60).

Second combination: DCI format 1_0 for scheduling a PDSCH_2 is scrambled by using (group identifier ID "01"+RA-RNTI), and the PDSCH_2 carries the second RAR group, including RARs with RAPIDs=(1, 5, 9, . . . , 61).

Third combination: DCI format 1_0 for scheduling a PDSCH_3 is scrambled by using (group identifier ID "10"+RA-RNTI), and the PDSCH_3 carries the third RAR group, including RARs with RAPIDs=(2, 6, 10, . . . , 62).

Fourth combination: DCI format 1_0 for scheduling a PDSCH_4 is scrambled by using (group identifier ID "11"+RA-RNTI), and the PDSCH_4 carries the fourth RAR group, including RARs with RAPIDs=(3, 7, 11, . . . , 63).

It should be noted that the RAR groups are indicated by the scrambling parameter in the DCI. The terminal device only needs to listen to DCI format 1_0 of CRC scrambled by using an identifier of a RAR group in which the terminal device is located and a RA-RNTI, and does not need to listen to and parse DCI indicating other RAR groups.

S402: The network device sends a first random access response RAR to the first terminal device based on the first preamble, where the first RAR belongs to the first RAR group, and the first RAR is carried on the first physical downlink shared channel PDSCH; and sends a second RAR to the second terminal device based on the second preamble, where the second RAR belongs to the second RAR group, and the second RAR is carried on the second PDSCH.

When the first RAR group and the second RAR group are carried on a same PDSCH for transmission, the first PDSCH and the second PDSCH are a same PDSCH. When the first RAR group and the second RAR group are carried on different PDSCHs for transmission, the first PDSCH and the second PDSCH are different PDSCHs.

First case: The RAR group information is indicated by an indication field in the DCI. The terminal device may listen to, in the random access response window, DCI format 1_0 of CRC scrambled by using the RA-RNTI. If the terminal device successfully receives and obtains, through decoding, the DCI in the DCI format 1_0 of the CRC scrambled by using the RA-RNTI, and the indication field of the DCI indicates that the scheduled PDSCH carries the RAR group in which RARs of the terminal device are located, the terminal device continues to receive the PDSCH. Because the RAR group carried on the PDSCH includes a plurality of RAPIDs, if the terminal device obtains, through detection, that a RAPID of a MAC subPDU in the PDSCH is the same as a preamble identifier (index) sent by the terminal device, it is considered that random access succeeds. If the indication field of the DCI does not indicate that the scheduled PDSCH carries the RAR group in which the RARs of the terminal device are located, the terminal device does not need to receive the PDSCH scheduled by using the DCI, and continues to listen to the DCI format 1_0 of the CRC scrambled by using the RA-RNTI, until the random access response window expires or a corresponding RAR is obtained through detection.

Second case: The RAR group information is indicated by a scrambling parameter in the DCI. The terminal device listens to, in the random access response window, the DCI format 1_0 of the CRC scrambled by using the identifier ID of the RAR group and the RA-RNTI. If successfully receiving and obtaining, through decoding, one piece of DCI in the DCI format 1_0 of the CRC scrambled by using the identifier ID and the RA-RNTI, the terminal device continues to receive the PDSCH scheduled by using the DCI. Because the RAR group carried on the PDSCH includes a plurality of RAPIDs, if the terminal device obtains, through detection, that a RAPID of a MAC subPDU in the PDSCH is the same as a preamble index sent by the terminal device, it is considered that random access succeeds. If the terminal device does not obtain, through detection, a RAR having an identifier that is the same as the preamble index sent by the terminal device, the terminal device continues to listen to the DCI format 1_0 of the CRC scrambled by using the identifier ID and the RA-RNTI, until the random access response window expires or a corresponding RAR is obtained through detection.

Finally, if the random access succeeds, a next operation continues to be performed, for example, sending a Msg3 based on an indication of the RAR. Otherwise, the random access may continue to be initiated based on a backoff parameter indicated by the network device, until the random access succeeds or a maximum quantity of times of random access is reached.

It should be noted that RARs of different terminal devices may belong to a same RAR group, and are carried on a same PDSCH. Alternatively, RARs of different terminal devices may belong to different RAR groups, and are carried on a same PDSCH. Alternatively, RARs of different terminal devices may belong to different RAR groups, and are carried on different PDSCHs.

In this embodiment of this application, RARs associated with one RO are transmitted based on groups, so that a transport block size of RAR data transmitted each time is reduced. This reduces a modulation order or a bit rate, and improves demodulation performance of the terminal device. In addition, the RAR groups carried on the PDSCH are indicated by the indication field or the scrambling parameter in the DCI, so that RAR detection performance is improved, and power consumption of the terminal device is reduced.

The method in embodiments of this application is described above in detail, and an apparatus in embodiments of this application is provided below.

Figure 8:
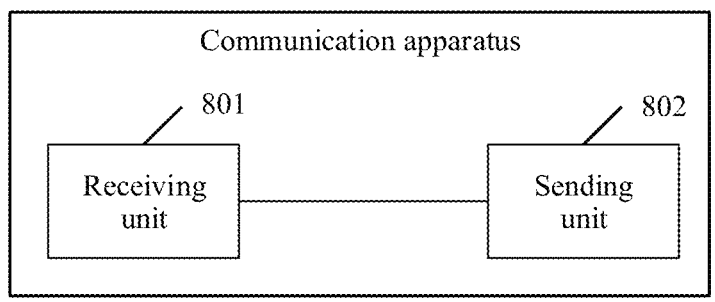
FIG. 8 is a schematic diagram of a structure of a communication apparatus according to an embodiment of this application.

FIG. 8 is a schematic diagram of a structure of a communication apparatus according to an embodiment of this application. The communication apparatus may include a receiving unit 801 and a sending unit 802. The communication apparatus may be, for example, a network device. Detailed descriptions of the units are as follows:

The receiving unit 801 is configured to receive a first random access preamble from a first terminal device and a second preamble from a second terminal device.

The sending unit 802 is further configured to send a first random access response RAR to the first terminal device based on the first preamble, where the first RAR belongs to a first RAR group, and the first RAR is carried on a first physical downlink shared channel PDSCH.

The sending unit 802 is further configured to send a second RAR to the second terminal device based on the second preamble, where the second RAR belongs to a second RAR group, and the second RAR is carried on a second PDSCH.

The first preamble and the second preamble correspond to a same random access occasion.

In an embodiment, the sending unit 802 is further configured to send first information to the first terminal device, where the first information indicates at least one RAR group carried on the first PDSCH, and the at least one RAR group includes the first RAR group.

In an embodiment, the at least one RAR group further includes the second RAR group, and the first PDSCH and the second PDSCH are a same PDSCH.

In an embodiment, the first information is indicated by an indication field in downlink control information DCI, or the first information is indicated by a scrambling parameter in DCI.

In an embodiment, the indication field includes N bits, the N bits are in a one-to-one correspondence with N RAR groups, and N is a positive integer.

In an embodiment, the scrambling parameter is determined based on an identifier of a RAR group.

In an embodiment, the RAR group meets at least one of the following: the RAR group is an equal group; the RAR group is a random group; and the RAR group is classified based on a type of the terminal device.

In an embodiment, the sending unit 802 is further configured to send second information to the first terminal device and the second terminal device, where the second information indicates a RAR group.

In an embodiment, the second information further indicates to determine, based on the RAR group information, a PDSCH corresponding to RARs.

In an embodiment, the sending unit 802 is further configured to send third information to the first terminal device and the second terminal device, where the third information indicates a preamble group, and the preamble group is used to determine the RAR group.

It should be noted that, for implementation of the units, correspondingly refer to corresponding descriptions in the method embodiment shown in FIG. 4, to perform the methods and the functions performed by the network device in the foregoing embodiments.

Figure 9:
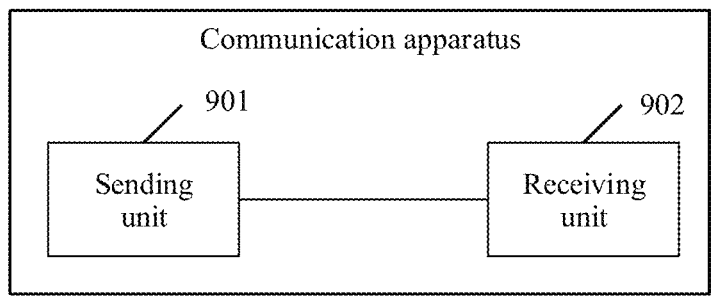
FIG. 9 is a schematic diagram of a structure of a communication apparatus according to an embodiment of this application.

FIG. 9 is a schematic diagram of a structure of a communication apparatus according to an embodiment of this application. The communication apparatus may include a sending unit 901 and a receiving unit 902. The communication apparatus may be, for example, a terminal device. Detailed descriptions of the units are as follows:

The sending unit 901 is configured to send a random access preamble to a network device.

The receiving unit 902 is configured to receive first information from the network device, where the first information indicates at least one RAR group carried on a first physical downlink shared channel PDSCH, and the at least one RAR group includes a first RAR group.

The receiving unit 902 is further configured to receive a random access response RAR from the network device, where the RAR belongs to the first RAR group, and the RAR is carried on the first PDSCH.

In an embodiment, the first information is indicated by an indication field in downlink control information DCI, or the first information is indicated by a scrambling parameter in DCI, where the DCI is used to schedule a PDSCH.

In an embodiment, the indication field includes N bits, the N bits are in a one-to-one correspondence with N RAR groups, and N is a positive integer.

In an embodiment, the scrambling parameter is determined based on an identifier of a RAR group.

In an embodiment, the RAR group meets at least one of the following: the RAR group is an equal group; the RAR group is a random group; and the RAR group is classified based on a type of the terminal device.

In an embodiment, the receiving unit 902 is further configured to receive second information from the network device, where the second information indicates a RAR group.

In an embodiment, the second information further indicates to determine, based on the RAR group information, a PDSCH corresponding to RARs.

In an embodiment, the receiving unit 902 is further configured to receive third information from the network device, where the third information indicates a preamble group, and the preamble group is used to determine the RAR group.

It should be noted that, for implementation of the units, correspondingly refer to corresponding descriptions in the method embodiment shown in FIG. 4, to perform the methods and the functions performed by the terminal device in the foregoing embodiments.

Figure 10:
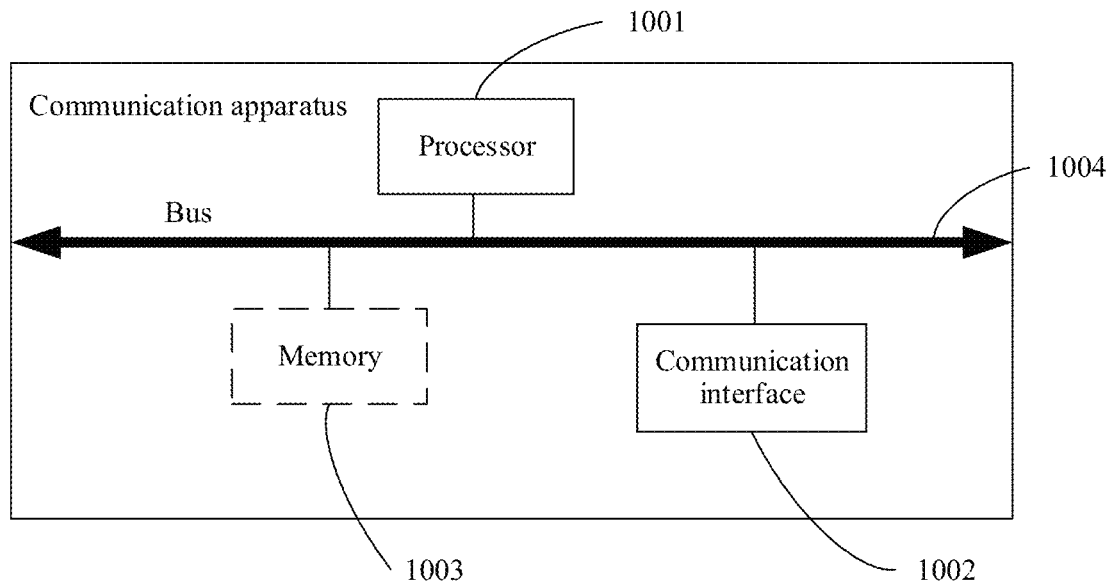
FIG. 10 is a schematic diagram of a structure of another communication apparatus according to an embodiment of this application.

FIG. 10 is a schematic diagram of a structure of another communication apparatus according to an embodiment of this application. The communication apparatus may be, for example, a network device. As shown in FIG. 10, the network device may include at least one processor 1001 and at least one communication interface 1002. In an embodiment, the network device may further include at least one memory 1003 and at least one communication bus 1004.

The processor 1001 may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The communication bus 1004 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 10, but this does not mean that there is only one bus or only one type of bus. The communication bus 1004 is configured to implement connection and communication between these components. The communication interface 1002 in the device in this embodiment of this application is configured to perform signaling or data communication with another node device. The memory 1003 may include a volatile memory, for example, a nonvolatile random access memory (nonvolatile random access memory, NVRAM), a phase-change random access memory (phase-change RAM, PRAM), or a magnetoresistive random access memory (magnetoresistive RAM, MRAM). The memory may alternatively include a nonvolatile memory, for example, at least one magnetic disk storage device, an electrically erasable programmable read-only memory (EEPROM), a flash storage device such as a NOR flash memory or a NAND flash memory, or a semiconductor device such as a solid-state disk (SSD). In an embodiment, the memory 1003 may alternatively be at least one storage apparatus far away from the processor 1001. In an embodiment, the memory 1003 may further store a set of program code, and, in an embodiment, the processor 1001 may further execute a program executed in the memory 1003.

A first random access preamble from a first terminal device and a second preamble from a second terminal device are received through the communication interface 1002.

A first random access response RAR is sent to the first terminal device based on the first preamble through the communication interface 1002, where the first RAR belongs to a first RAR group, and the first RAR is carried on a first physical downlink shared channel PDSCH.

A second RAR is sent to the second terminal device based on the second preamble through the communication interface 1002, where the second RAR belongs to a second RAR group, and the second RAR is carried on a second PDSCH.

The first preamble and the second preamble correspond to a same random access occasion.

In an embodiment, first information is sent to the first terminal device through the communication interface 1002, where the first information indicates at least one RAR group carried on the first PDSCH, and the at least one RAR group includes the first RAR group.

In an embodiment, the at least one RAR group further includes the second RAR group, and the first PDSCH and the second PDSCH are a same PDSCH.

In an embodiment, the first information is indicated by an indication field in downlink control information DCI, or the first information is indicated by a scrambling parameter in DCI.

In an embodiment, the indication field includes N bits, the N bits are in a one-to-one correspondence with N RAR groups, and N is a positive integer.

In an embodiment, the scrambling parameter is determined based on an identifier of a RAR group.

In an embodiment, the RAR group meets at least one of the following: the RAR group is an equal group; the RAR group is a random group; and the RAR group is classified based on a type of the terminal device.

In an embodiment, second information is sent to the first terminal device and the second terminal device through the communication interface 1002, where the second information indicates a RAR group.

In an embodiment, the second information further indicates to determine, based on the RAR group information, a PDSCH corresponding to RARs.

In an embodiment, third information is sent to the first terminal device and the second terminal device through the communication interface 1002, where the third information indicates a preamble group, and the preamble group is used to determine the RAR group.

Further, the processor may further cooperate with the memory and the communication interface, to perform operations performed by the network device in the foregoing embodiments of this application.

Figure 11:
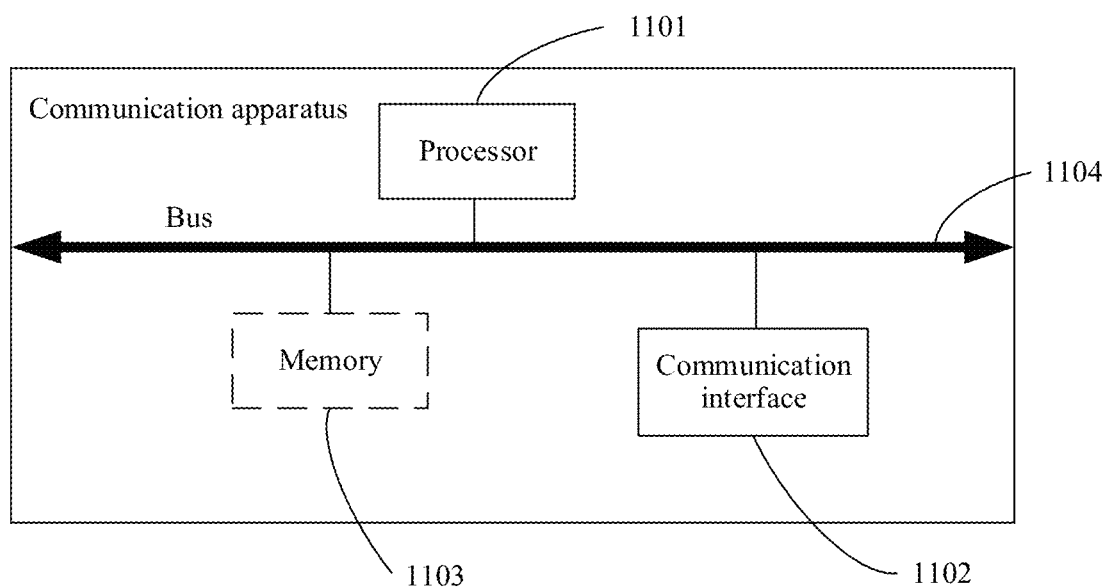
FIG. 11 is a schematic diagram of a structure of another communication apparatus according to an embodiment of this application.

FIG. 11 is a schematic diagram of a structure of another communication apparatus according to an embodiment of this application. The communication apparatus may be, for example, a terminal device. As shown in the figure, the terminal device may include at least one processor 1101 and at least one communication interface 1102. In an embodiment, the terminal device may further include at least one memory 1103 and at least one communication bus 1104.

The processor 1101 may be processors of various types mentioned above. The communication bus 1104 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 11, but this does not mean that there is only one bus or only one type of bus. The communication bus 1104 is configured to implement connection and communication between these components. The communication interface 1102 in the device in this embodiment of this application is configured to perform signaling or data communication with another node device. The memory 1103 may be memories of various types mentioned above. In an embodiment, the memory 1103 may alternatively be at least one storage apparatus far away from the processor 1101. The memory 1103 stores a set of program code, and the processor 1101 executes a program that is in the memory 1103 and that is executed by the OAM.

A random access preamble is sent to a network device through the communication interface 1102.

First information from the network device is received through the communication interface 1102, where the first information indicates at least one RAR group carried on a first physical downlink shared channel PDSCH, and the at least one RAR group includes a first RAR group.

A random access response RAR from the network device is received through the communication interface 1102, where the RAR belongs to the first RAR group, and the RAR is carried on the first PDSCH.

In an embodiment, the first information is indicated by an indication field in downlink control information DCI, or the first information is indicated by a scrambling parameter in DCI, where the DCI is used to schedule a PDSCH.

In an embodiment, the indication field includes N bits, the N bits are in a one-to-one correspondence with N RAR groups, and N is a positive integer.

In an embodiment, the scrambling parameter is determined based on an identifier of a RAR group.

In an embodiment, the RAR group meets at least one of the following: the RAR group is an equal group; the RAR group is a random group; and the RAR group is classified based on a type of the terminal device.

In an embodiment, second information from the network device is received through the communication interface 1102, where the second information indicates a RAR group.

In an embodiment, the second information further indicates to determine, based on the RAR group information, a PDSCH corresponding to RARs.

In an embodiment, third information from the network device is received through the communication interface 1102, where the third information indicates a preamble group, and the preamble group is used to determine the RAR group.

Further, the processor may further cooperate with the memory and the communication interface, to perform operations performed by the terminal device in the foregoing embodiments of this application.

All or some of the foregoing embodiments may be implemented by software, hardware, firmware, or any combination thereof. When the software is used for implementation, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like.

An embodiment of this application further provides a communication system. The communication system includes the foregoing at least one terminal device and/or the foregoing at least one network device.

The objectives, technical solutions, and beneficial effects of this application are further described in detail in the foregoing implementations. Any modification, equivalent replacement, or improvement made without departing from the spirit and principle of this application shall fall within the protection scope of this application.

What is claimed is:

1. A random access response (RAR) method, wherein the method comprises:
    receiving a first random access preamble from a first terminal device and a second random access preamble from a second terminal device, wherein the first terminal device and the second terminal device are separate devices;
    sending a first RAR to the first terminal device based on the first random access preamble, wherein the first RAR belongs to a first RAR group, and the first RAR is carried on a first physical downlink shared channel (PDSCH); and
    sending a second RAR to the second terminal device based on the second random access preamble, wherein the second RAR belongs to a second RAR group, and the second RAR is carried on a second PDSCH, wherein the first random access preamble and the second random access preamble correspond to a same random access occasion, wherein the first PDSCH and the second PDSCH are a same PDSCH, and wherein the first RAR and the second RAR are separate RARs.

2. The method according to claim 1, wherein the method further comprises:
    sending first information to the first terminal device, wherein the first information indicates at least one RAR group carried on the first PDSCH, and the at least one RAR group comprises the first RAR group.

3. The method according to claim 2, wherein the at least one RAR group further comprises the second RAR group.

4. The method according to claim 2, wherein the first information is indicated by an indication field in downlink control information (DCI), or the first information is indicated by a scrambling parameter in DCI.

5. The method according to claim 4, wherein the indication field comprises N bits, the N bits are in a one-to-one correspondence with N RAR groups, and N is a positive integer.

6. The method according to claim 4, wherein the scrambling parameter is determined based on an identifier of a RAR group.

7. The method according to claim 1, wherein the RAR group meets at least one of the following: the RAR group is an equal group; the RAR group is a random group; and the RAR group is classified based on a type of a terminal device.

8. The method according to claim 1, wherein the method further comprises:
    sending second information to the first terminal device and the second terminal device, wherein the second information indicates a RAR group.

9. A random access response (RAR) method, wherein the method comprises:
    sending a first random access preamble from a first terminal device to a network device, wherein the first terminal device and a second terminal device are separate devices;
    receiving first information from the network device, wherein the first information indicates at least one RAR group carried on a first physical downlink shared channel (PDSCH), and the at least one RAR group comprises a first RAR group; and
    receiving a first RAR from the network device, where in the first RAR belongs to the first RAR group, and the RAR is carried on the first PDSCH, a second terminal receives a second RAR carried on a second PDSCH from the network device, and the first PDSCH and the second PDSCH are a same PDSCH, and wherein the first RAR and the second RAR are separate RARs.

10. The method according to claim 9, wherein the first information is indicated by an indication field in downlink control information DCI, or the first information is indicated by a scrambling parameter in DCI.

11. The method according to claim 10, wherein the indication field comprises N bits, the N bits are in a one-to-one correspondence with N RAR groups, and N is a positive integer.

12. The method according to claim 10, wherein the scrambling parameter is determined based on an identifier of a RAR group.

13. The method according to claim 9, wherein the RAR group meets at least one of the following: the RAR group is an equal group; the RAR group is a random group; and the RAR group is classified based on a type of a terminal device.

14. The method according to claim 9, wherein the method further comprises:
receiving second information from the network device, wherein the second information indicates a RAR group.

15. An apparatus, comprising:
one or more processors; and
one or more memories coupled to the one or more processors and storing programming instructions for execution by the one or more processors to cause the apparatus to:
send a first random access preamble from a first terminal device to a network device, wherein the first terminal device and a second terminal device are separate devices;
receive first information from the network device, wherein the first information indicates at least one random access response (RAR) group carried on a first physical downlink shared channel (PDSCH), and the at least one RAR group comprises a first RAR group; and
receive a first RAR from the network device, wherein the first RAR belongs to the first RAR group, and the RAR is carried on the first PDSCH, a second terminal receives a second RAR carried on a second PDSCH from the network device, and the first PDSCH and the second PDSCH are a same PDSCH, and wherein the first RAR and the second RAR are separate RARs.

16. The apparatus according to claim 15, wherein the first information is indicated by an indication field in downlink control information (DCI), or the first information is indicated by a scrambling parameter in DCI.

17. The apparatus according to claim 16, wherein the indication field comprises N bits, the N bits are in a one-to-one correspondence with N RAR groups, and N is a positive integer.

18. The apparatus according to claim 16, wherein the scrambling parameter is determined based on an identifier of a RAR group.

19. The apparatus according to claim 15, wherein the RAR group meets at least one of the following: the RAR group is an equal group; the RAR group is a random group; and the RAR group is classified based on a type of a terminal device.

20. The apparatus according to claim 15, wherein the apparatus is further to:
receive second information from the network device, wherein the second information indicates a RAR group.

* * * * *